Nov. 4, 1930.  C. A. WINSLOW ET AL  1,780,663
OIL FILTER
Filed May 5, 1925   3 Sheets-Sheet 1
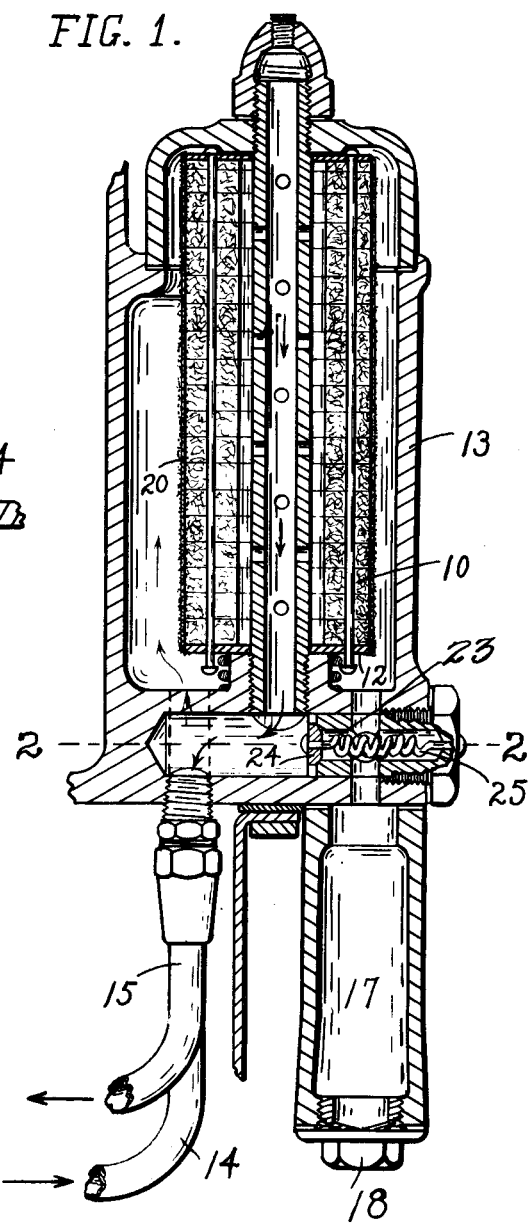
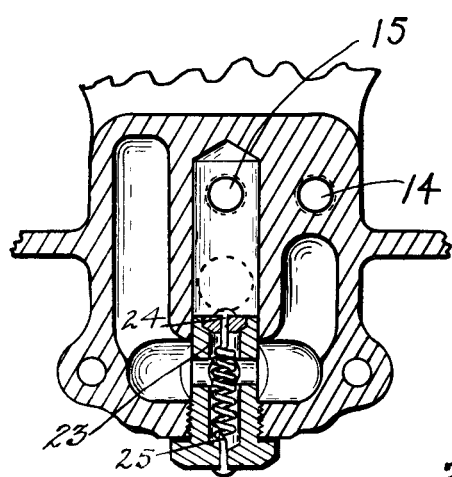
Inventors
E. J. Hall   C. A. Winslow.

Nov. 4, 1930.  C. A. WINSLOW ET AL  1,780,663
OIL FILTER
Filed May 5, 1925  3 Sheets-Sheet 2
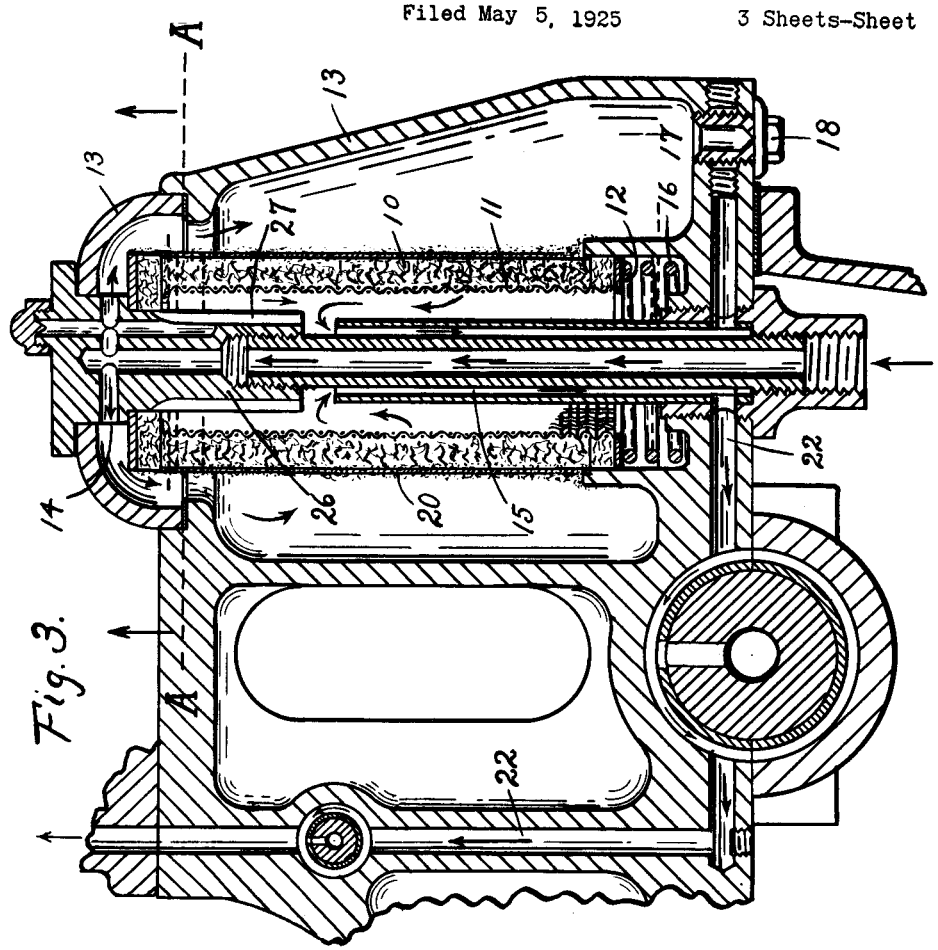
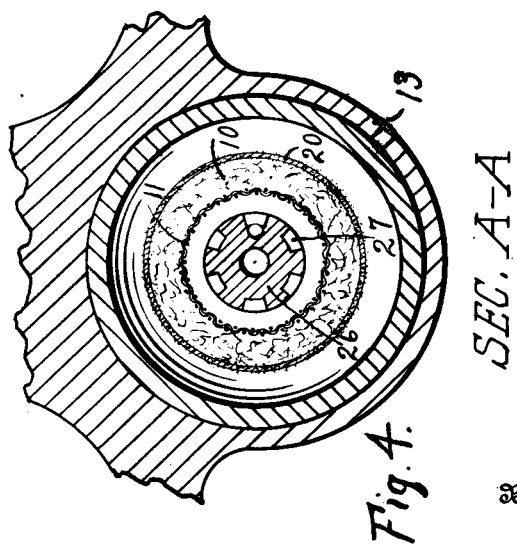
Inventors
E. J. Hall  C. A. Winslow.

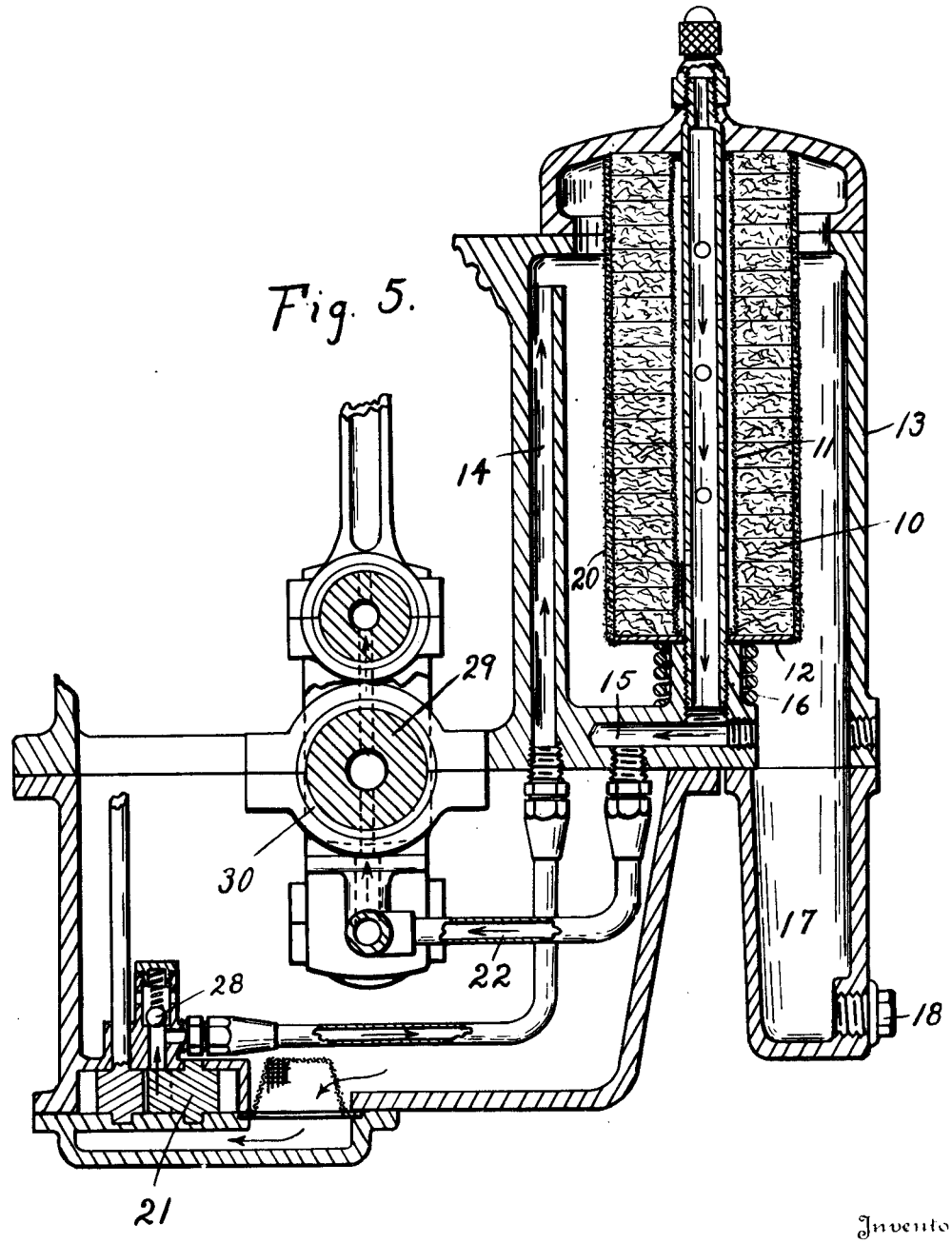

Patented Nov. 4, 1930

1,780,663

UNITED STATES PATENT OFFICE

CHARLES A. WINSLOW, OF VALLEJO, AND ELBERT J. HALL, OF BERKELEY, CALIFORNIA

OIL FILTER

Application filed May 5, 1925. Serial No. 28,211.

This invention relates to filters for filtering oil and more especially the filtering of oil used in the lubrication of engines and like machines.

The invention has for its object to provide a highly efficient filter for filtering oil wherein substantially all of the impurities and solid particles will be removed and wherein the filtering element is capable of constant and indefinite use without being cleaned or replaced or its efficiency impaired.

Hitherto the filtering of oil, as, for instance, that used in lubricating the crank bearings and other parts of an engine, has received a great deal of attention, and suggestions have been made for the inclusion in the lubricating system of a filtering medium; but so far as we are aware none has proved successful. Among these suggestions is the use of saturation filters made of hair, felt and various kinds of fabric through which oil is forced under relatively high pressures. Such prior filters quickly clog and must be frequently cleaned or replaced. Furthermore they do not give the desired degree of filtration. We have experimented at length with various types of filters, subjecting them to exacting tests, with the result that the present invention was arrived at.

The present invention consists in utilizing as the filtering medium the solid particles present in the oil which are made up principally of carbon resulting from decomposed oil in the engine and a small percentage of metallic particles resulting from wear on the working faces of the various engine parts which are included in the lubricating system. These carbon and metallic particles are collected on the walls of a porous support disposed in the path of the oil. The oil is, of course, circulated under pressure and we carefully predetermine the pressure difference between the inlet and outlet sides of the filter so as to prevent undue compacting of the solid particles or forcing such a mass of solid particles into the porous support as would result in clogging or stopping the pores.

To accomplish this a relatively small pressure difference between the inlet and outlet sides of the filter is necessary and this may be obtained either by use of a pressure relief means between the filter and the oil line with suitable connections for passing the oil around the filter when this predetermined filter pressure is reached or proportioning the filter area in accordance with the rate of flow of the oil through the parts to be lubricated.

In addition to properly predetermining the maximum pressure difference on the opposite sides of the filtering medium, provision must be made within the filter housing to prevent the solid particles from building up on the walls of the porous support to such a depth as would be likely to interfere with the proper filtering of the oil. We find that this problem will be automatically taken care of if ample clearance is provided between the inlet side of the filtering medium and the surrounding walls or casing, and a collecting chamber or trap be arranged in the bottom of the filter housing, preferably outside of the zone of turbulence occurring in the oil.

In other words, in a properly designed filter where no obstructions are present between the inlet surfaces of the filtering medium and the sediment chamber or trap, the deposited solid particles on the porous support will upon reaching a certain depth or thickness fall off under their own weight and gravitate to the collecting chamber or trap, provided, of course, they are not hindered by a pressure difference on the inlet side of the filter which may be so high as to interfere.

With proper consideration given to the foregoing factors, it is possible to build up a highly efficient oil filter composed of a layer or film of solid particles resulting from decomposition of the oil and wear on the bearing surfaces of the engine or machine, and to maintain this layer in such a condition that it will function for an indefinite length of time as an efficient filter without becoming clogged or stopped up and without any attention as to cleaning or replacement.

In the sense that the solid particles collecting on the walls of the porous substance have the property of accelerating filtration without undergoing any change or becoming ineffective, it may be stated that a catalyzing action occurs wherein the carbon and metallic particles are the catalyzer.

While the present invention is primarily a method or process capable of application in many forms, we have deemed it advisable to illustrate in connection herewith several forms of apparatus embodying our invention and which forms have been found by prolonged tests and experimentation to be satisfactory and capable of accomplishing the purpose above mentioned.

In the accompanying drawing,

Figure 1 shows a vertical central sectional view of a device suitable for the purpose of our invention;

Fig. 2 shows a cross section taken on the line 2—2 of Fig. 1;

Fig. 3 shows a vertical central sectonal view of a modified arrangement of filter applied to the lubricating system of an internal combustion engine;

Fig. 4 shows a cross section taken on the line A—A of Fig. 3; and

Fig. 5 shows a vertical central sectional view of a still further modified form of filter.

The device in the forms herein shown comprise a series of superimposed layers of washers 10, made of felt or other fabric and forming a cylinder or hollow column of a porous nature. These washers are stacked one on the other, on a screen 11 and compressed to the desired degree of density between end plates 12, or otherwise. Preferably, there should not be any screen at the outer side of the washers, as it tends to interfere with the proper operation of the filter.

The cylinder composed of these compressed washers, and which may be considered as a support for the filtering medium is placed in a casing 13 having an inlet connection 14 and an outlet connection 15. As shown herein, the inlet connection opens into the casing in the zone surrounding the cylinder, and the outlet connection communicates with the axis of the cylinder, so that the oil or other liquid to be filtered must pass through the cylinder radially thereof. In some cases, it may be desirable to employ a spring 16 to maintain a yielding pressure upon the washers so as to take up any looseness resulting from shrinkage of the fabric.

In the bottom of the casing is a collecting chamber or trap 17 fitted with a removable cap or plug 18 for draining or emptying it.

In applying the filter to an internal combustion engine having a force feed lubricating system, the inlet to the filter may be placed in direct communication with the sump of the crank case or may be connected to the discharge line of the pump 21, which supplies the parts to be lubricated. The outlet from the filter in the former instance would lead to the suction side of the pump, and in the latter instance would connect with an oil distribution line 22 leading to the parts to be lubricated. In other words, the filter may be operated under suction or pressure above atmospheric, as desired.

The porous support 10 will serve to screen out and collect upon its exterior walls solid particles such as carbon and metallic dust present in the oil. A layer 20 of such solid particles will in a short time accumulate to the desired depth, forming a highly efficient filtering medium either alone or in conjunction with the porous support, and this filtering medium will continue indefinitely to function without cleaning or replacement, provided the solid particles are not unduly compacted or driven into the porous support. By the maintenance of a relatively low pressure difference on opposite sides of the walls 10, the particles deposited on the inlet side of the walls 10 can be kept sufficiently fluffy and porous to afford a high degree of filtering efficiency at all times, and the thickness of this deposit can be kept within proper limits automatically owing to the fact that such particles are not sufficiently cohesive to accumulate to any considerable depth and therefore upon reaching a certain thickness they will become dislodged and if proper clearance and spaces are provided for allowing them to gravitate to the bottom of the filter housing and enter a chamber or trap outside of the filtering zone, the collected particles on the walls 10 will maintain a substantially uniform depth and no manual attention need be given to the condition of the filtering element at any time.

The depth to which the solid particles will accumulate before falling off of their own weight appears to be affected somewhat by the character of the fabric forming the supporting walls. A hairy substance, like felt, will collect an outside film or layer of particles about one-eighth of an inch in depth. The extent to which the solid particles will penetrate the supporting walls depends upon the density of the fabric or size of the pores in the supporting wall. A highly compressed felt or fabric will allow slight penetration and in practice it is advisable to use a somewhat higher pressure on the inlet side of the filter in order to obtain the desired rate of filtration of the oil. A loose felt or fabric permits of greater depth of penetration of the solid particles and the pressure on the inlet side of the filter should be somewhat lower in such cases in order to avoid forcing the solid particles into the supporting wall in such a mass as would be liable to stop up the pores.

These factors are taken care of in the present invention by first ascertaining what is a safe maximum pressure for the density of fabric used in the supporting walls and then making provision for preventing any pressure above this determined maximum. Such regulation of the pressure may be accomplished in a variety of ways, one such being shown in Figs. 1 and 2 where a passageway 23 connects the inlet 14 and outlet 15 around the filtering medium and a relief valve 24 with properly adjusted spring or other tension means 25 thereon is provided in the passageway. This valve is set to open automatically when the pressure on the inlet side of the filtering medium exceeds the pressure on the outlet side by the predetermined maximum. The oil will thereby be shunted around the filtering medium when the pressure difference on opposite sides of the filtering medium reaches the predetermined maximum, thus preventing any excessively high pressures on the inlet side in comparison with the pressure on the outlet side.

Various other kinds of pressure regulating valves may be used for the purpose. In Fig. 3 we show a by-pass which is opened by a downward movement of the filtering element created when the pressure in the filter housing reaches a predetermined maximum. Here the filtering element is slidably fitted at its upper end on an inlet pipe 26. Normally the filtering element is held in tight engagement with the end of this pipe by means of the spring 16 so that oil cannot pass by. However, when the pressure on the oil around the filtering element reaches a predetermined maximum, the filtering element will be forced down against the spring thereby uncovering longitudinal slots or ports 27 so that oil may pass them directly to the outlet. This vertical movement of the filtering element will also be a benefit in assisting to dislodge excess accumulations or solid particles from the walls of the filtering element due to the vibrations which will be caused in the operation of the filter.

The valves may be omitted entirely in the case of an installation such as shown in Fig. 5 where the filtering area is made sufficiently large to permit a rate of flow of oil at the predetermined maximum which will equal the feeding capacity of the bearings under all conditions. In this system, the pump is provided with a relief valve 28 which opens and allows the oil to be returned direct to the crank case when pressure in the distributing line reaches a certain maximum. The bearings 29 are provided with tightly closed oil grooves 30 so that a definite amount of oil can pass through at maximum pressure.

At this maximum the bearings will allow a definite amount of oil to pass, varying, of course, somewhat according to the viscosity and temperature of the oil. However, these same viscosity and temperature conditions which affect the flow of oil through the bearings affect the flow of oil through the filter in the same proportion. Therefore, if the filter has a sufficiently large area to afford a rate of flow, at a pressure differential of four pounds, which will be equal to or greater than the rate of flow through the bearings under maximum pump pressure, then this four pound pressure difference on opposite sides of the filtering medium will never be exceeded and no necessity arises for providing any additional pressure regulating means or by-pass.

The present invention is deemed of considerable importance, for the reason that lubricating oil such as is used in engines or other machines for relieving the wear and friction, can, if properly filtered, be reused constantly, until it is completely exhausted, thus effecting a considerable saving in the consumption of oil. A further advantage of proper filtering of oil is that the removal of solid carbon and other heavy basic impurities from the oil, has the effect of producing a lubricant of good body. In other words, casual observation would suggest that if the solid carbon and other heavy bases be filtered out, the resultant body of oil would become thin and filled with light hydro-carbons, such as gasoline, benzine, etc. However, this is not the case for it appears that solid carbon and other heavy bases have an affinity for the lighter hydro-carbons and whereas these heavy bases are removed the gasoline and other volatile products will pass off in gaseous form, leaving a body of good lubricating oil. An efficient filter in the lubricating system of an internal combustion engine makes it possible to employ force-feed lubrication without danger of circulating any injurious substance through any of the bearings, regardless of the extent of re-use of the same lubricant. Consequently, the life of the bearings can be made to equal that of any other part of the engine.

While the benefits of properly filtering the oil in connection with the lubrication of an engine have long been recognized, the use of oil filters other than coarse strainers, has never come into use in the automotive art, for the reason that prior filters capable of removing any substantial percentage of impurities become clogged very quickly and require frequent cleaning and replacement.

The present invention makes it possible at a relatively low initial cost to provide a highly efficient filter capable of removing substantially all of the impurities from the oil and likewise capable of constant use for an indefinite period without becoming stopped up or worn out or requiring any cleaning other than the draining or cleaning out of the sediment chamber or trap in the bottom of the filter housing.

We have used a filter made in accordance with the present invention in a lubricating system of an automobile engine throughout a period corresponding to fifty thousand miles of operation of an automobile. Throughout these operations, the filter required no cleaning or replacement and at the end of the test showed no evidence of decreased efficiency or life nor any necessity for repairs or cleaning. The only attention given to the filter throughout these operations was to drain the sediment chamber at infrequent intervals.

By proper regulation of pressure differences on opposite sides of the filtering element so as to maintain a relatively small pressure difference, the water present in the oil is filtered out and prevented from impregnating the filtering element. Ordinarily under high pressure the water present in the oil would permeate the filtering element and interfere to some extent with the efficiency of the filter. This, however, is overcome in the present method. Thus we not only remove solid impurities, such as dirt, grit, carbon, metallic dust, etc., but also particles of water and other diluents normally present in oil used for the lubrication of internal combustion engines.

We claim:

1. A pressure filter for the purpose mentioned comprising a housing having an inlet and an outlet port, a collecting medium of compressible porous fibrous substance interposed between said ports adapted to collect a layer of carbon and other solid particles normally present in oil used for lubricating purposes under high temperatures formed at or near the surface of the collecting medium and means for maintaining pressure differences on opposite sides of the collecting medium within limits sufficiently low to prevent the solid particles from filling the pores of the collecting medium and means for applying a yielding compression force to the said porous substance for maintaining the latter at a substantially uniform density, regardless of shrinkage or expansion.

2. A pressure filter for the purpose mentioned comprising a housing having an inlet and an outlet port, a collecting medium of compressible porous, fibrous substance interposed between said ports adapted to collect a layer of carbon and other solid particles normally present in oil used for lubricating purposes under high temperatures formed at or near the surface of the collecting medium, means for maintaining pressure differences on opposite sides of the collecting medium within limits sufficiently low to prevent the solid particles from filling the pores of the collecting medium, and means for applying a yielding compression force to the said porous substance for maintaining the latter at a substantially uniform density, regardless of shrinkage or expansion, said last named means being so disposed that its compression force upon said porous substance is automatically overcome when a fluid is directed backwardly through the filter for cleaning the same.

In testimony whereof we affix our signatures.

CHAS. A. WINSLOW.
ELBERT J. HALL.